(12) United States Patent
Fabre et al.

(10) Patent No.: US 11,648,739 B2
(45) Date of Patent: May 16, 2023

(54) RTM INJECTION MOLD AND METHOD USING ASYMMETRIC ANTI-PINCHING SECTORS

(71) Applicant: SAFRAN AIRCRAFT ENGINES, Paris (FR)

(72) Inventors: Hubert Jean Marie Fabre, Moissy-Cramayel (FR); Vincent Bernard Serge Most, Moissy-Cramayel (FR); Paul Terry, Franklin, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/321,162

(22) Filed: May 14, 2021

(65) Prior Publication Data

US 2021/0379844 A1   Dec. 9, 2021

Related U.S. Application Data

(60) Provisional application No. 63/034,571, filed on Jun. 4, 2020.

(51) Int. Cl.
| | |
|---|---|
| *B29C 33/48* | (2006.01) |
| *B29C 70/54* | (2006.01) |
| *B29C 70/48* | (2006.01) |
| *B29L 31/00* | (2006.01) |

(52) U.S. Cl.
CPC .............. *B29C 70/54* (2013.01); *B29C 70/48* (2013.01); *B29C 33/48* (2013.01); *B29L 2031/7504* (2013.01)

(58) Field of Classification Search
CPC .......... B29C 45/2616; B29C 2033/385; B29C 33/302; B29C 33/0088; B29C 33/301; B29C 33/44; B29C 33/48; B29C 33/485
See application file for complete search history.

(56) References Cited

U.S. PATENT DOCUMENTS

| | | | | |
|---|---|---|---|---|
| 2,683,912 | A * | 7/1954 | Serrell ................... | B28B 21/88 249/105 |
| 2,937,476 | A * | 5/1960 | Davies ................... | C03B 19/02 264/DIG. 44 |
| 3,164,877 | A * | 1/1965 | Lee ......................... | B28B 21/88 249/179 |
| 3,784,338 | A * | 1/1974 | Previati ................. | B29D 29/00 425/34.2 |
| 4,233,020 | A * | 11/1980 | Oswald ................. | B29C 33/485 242/576.1 |

(Continued)

*Primary Examiner* — Matthew J Daniels
(74) *Attorney, Agent, or Firm* — Bookoff McAndrews, PLLC

(57) ABSTRACT

An injection mold for the manufacture of an axisymmetric part of composite material including a mandrel supporting a fibrous preform and including an annular wall, and a plurality of counter-mold angular sectors assembled on the mandrel and intended to close the mold and to compact the fibrous preform wound on the mandrel. Each angular sector includes an annular base intended to come into contact with the fibrous preform. The annular base extends between the first and second lateral edges in a circumferential direction, the first lateral edge of the annular base of an angular sector being in contact with a second lateral edge of the annular base of an adjacent angular sector.

9 Claims, 10 Drawing Sheets

(56) References Cited

U.S. PATENT DOCUMENTS

| | | | | |
|---|---|---|---|---|
| 4,448,628 A | * | 5/1984 | Stott | B29C 53/824 |
| | | | | 156/425 |
| 4,633,632 A | * | 1/1987 | Sarh | B64C 1/12 |
| | | | | 52/84 |
| 4,754,543 A | * | 7/1988 | Spivy | B29C 33/485 |
| | | | | 279/2.24 |
| 8,322,971 B2 | | 12/2012 | Coupe et al. | |
| 2018/0370082 A1 | * | 12/2018 | Mathon | B29C 70/32 |

* cited by examiner

[Fig. 1]
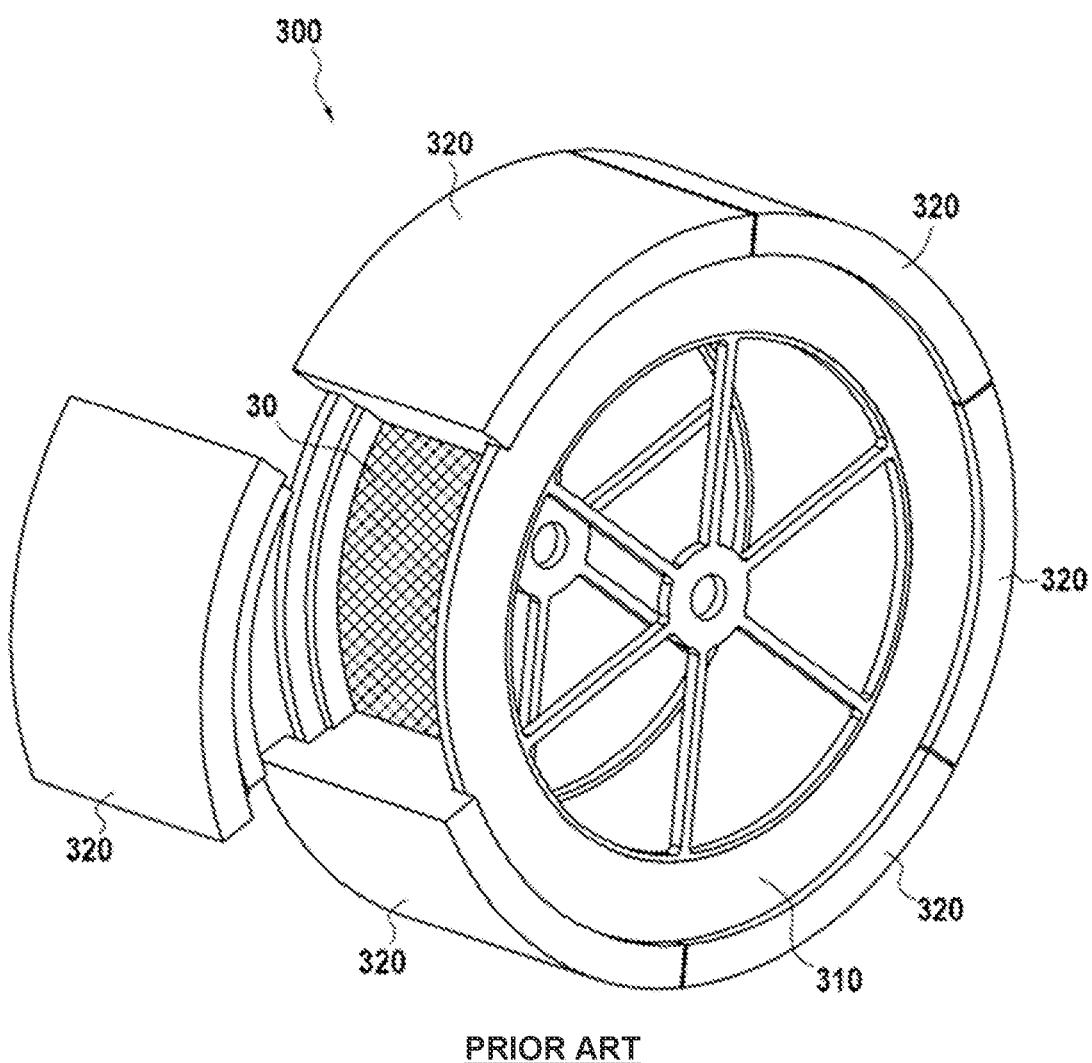
PRIOR ART

[Fig. 2A]
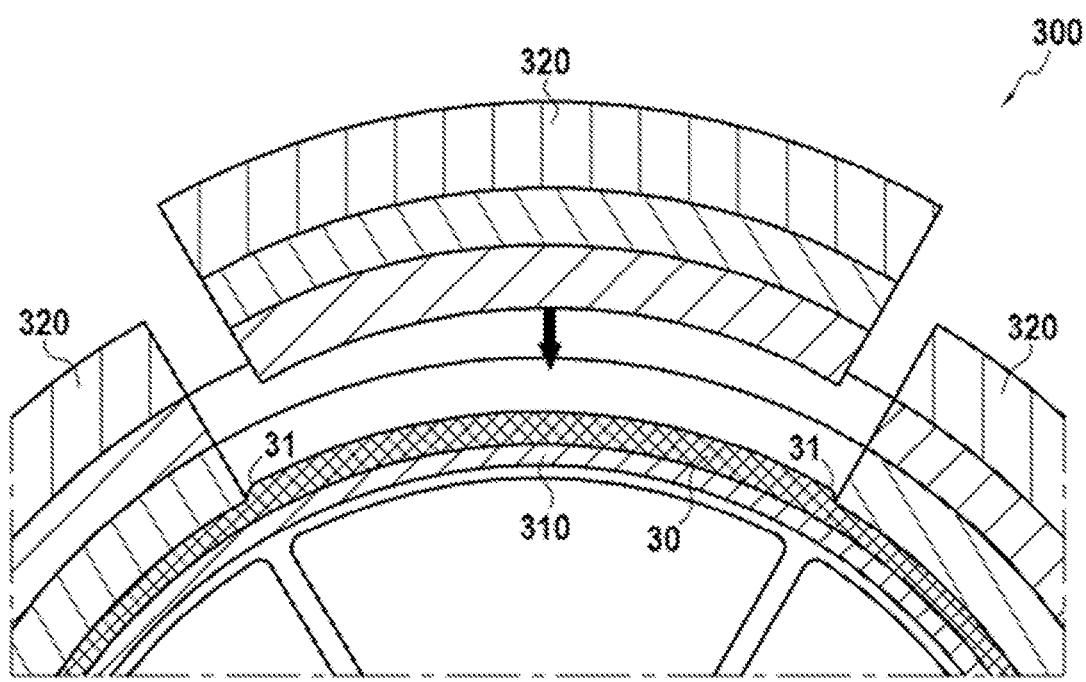
PRIOR ART

[Fig. 2B]
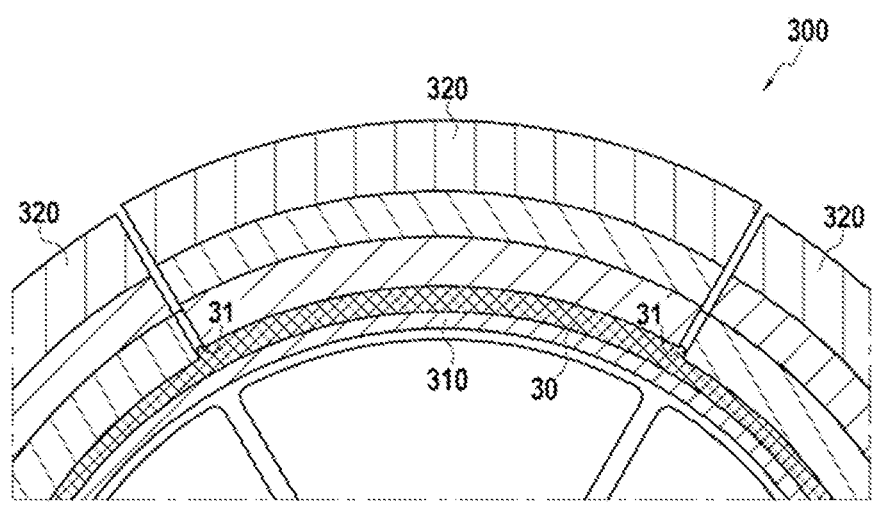
PRIOR ART

[Fig. 2C]
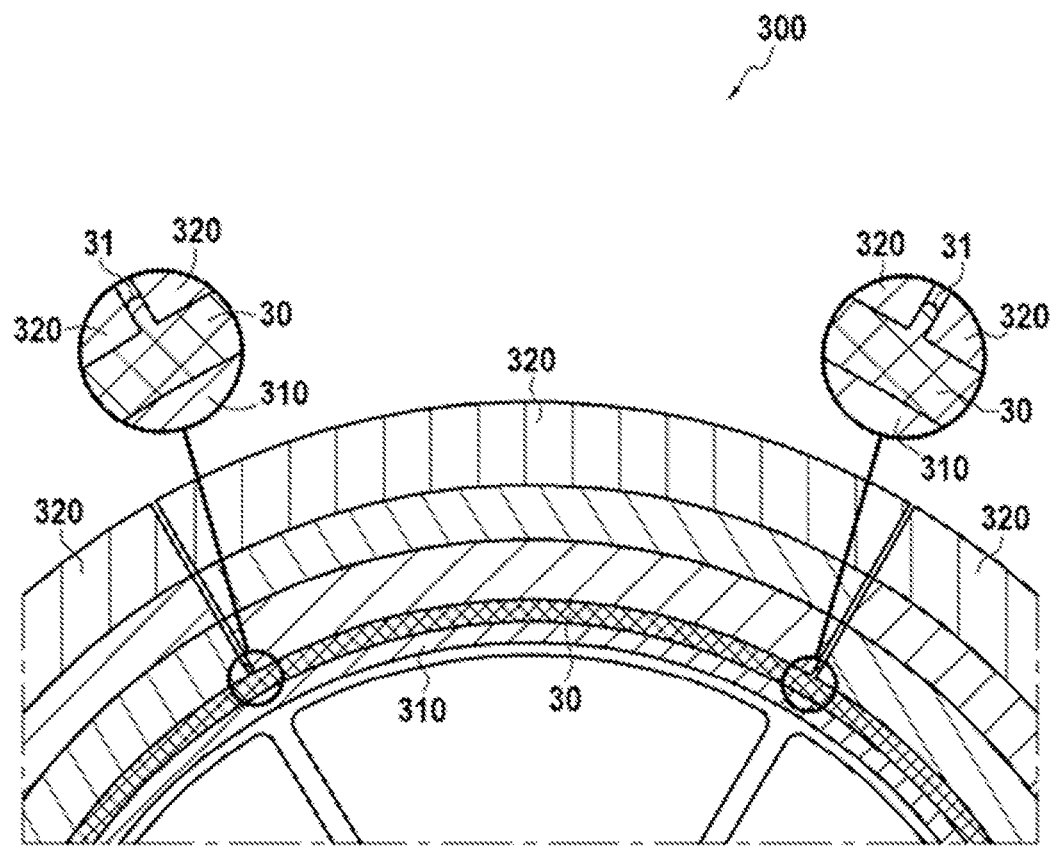
PRIOR ART

[Fig. 3]
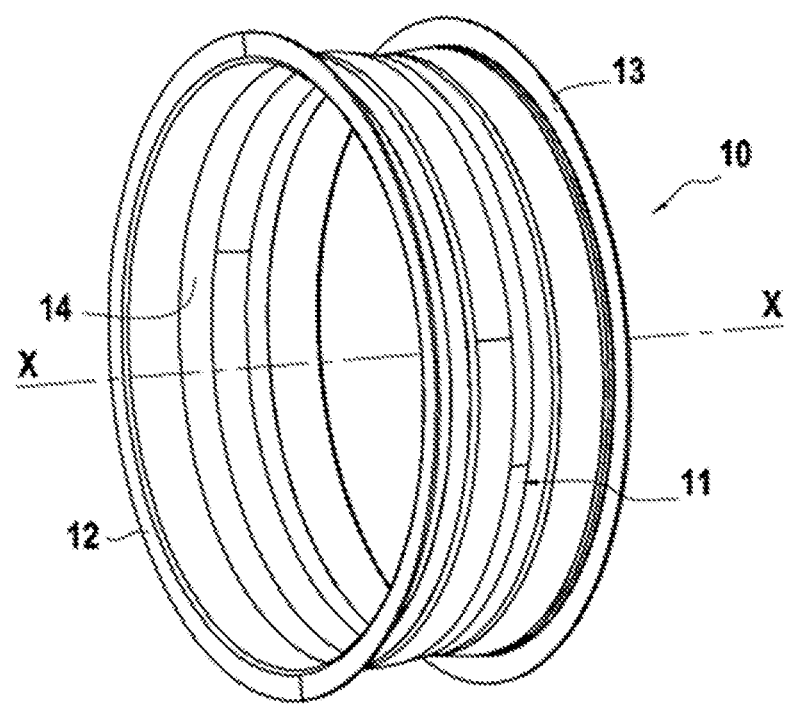

[Fig. 4]
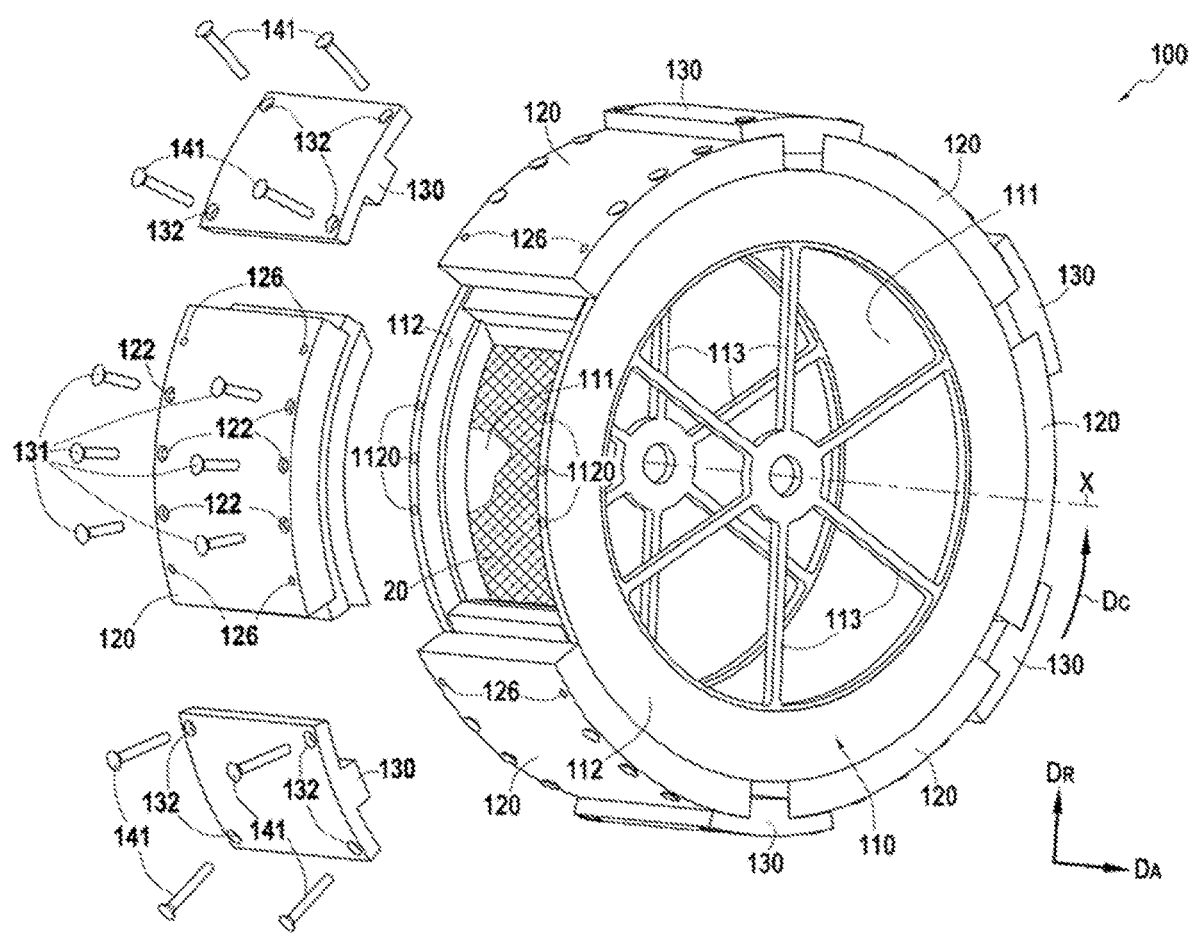

[Fig. 5]
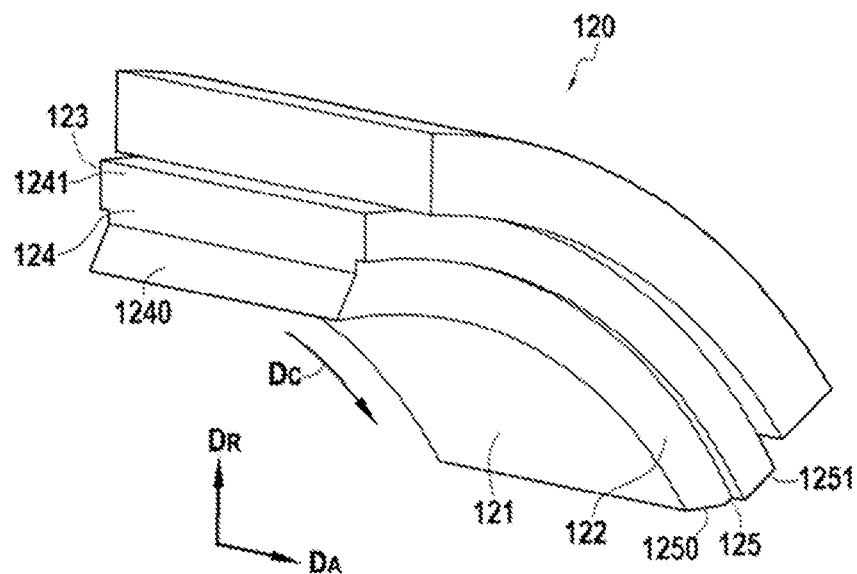
[Fig. 6]
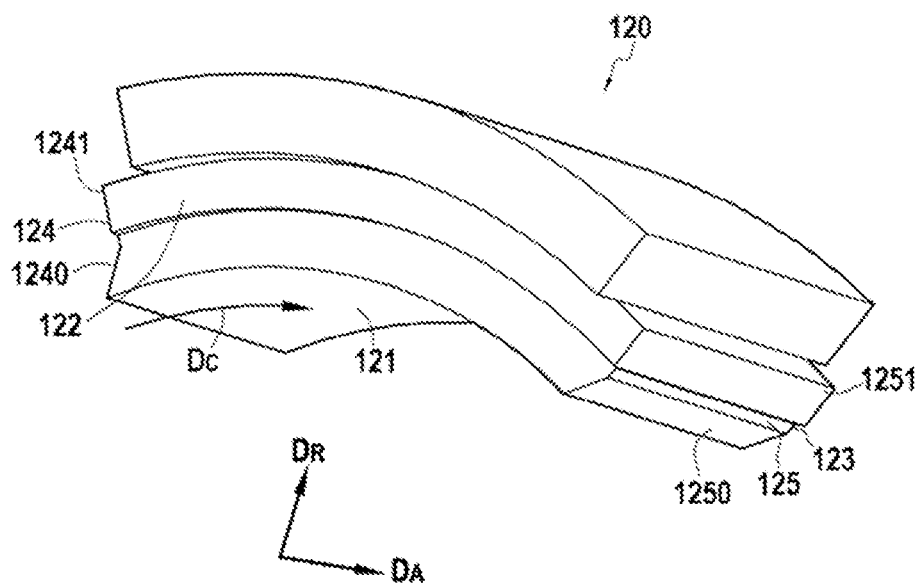

[Fig. 7A]
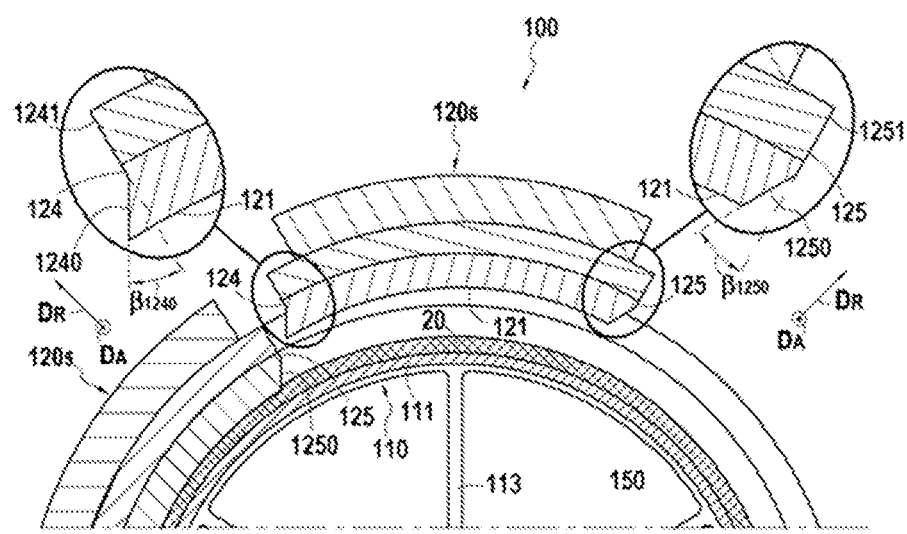
[Fig. 7B]
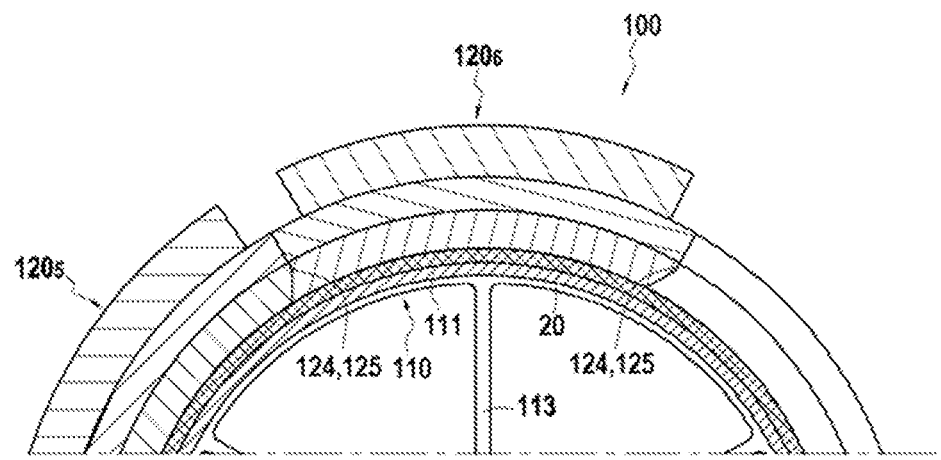

[Fig. 8]
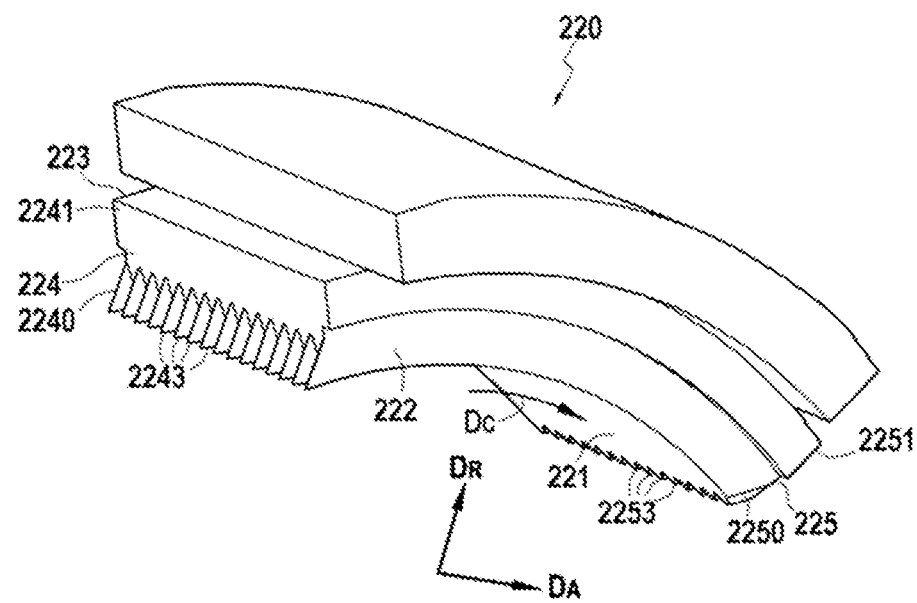
[Fig. 9]
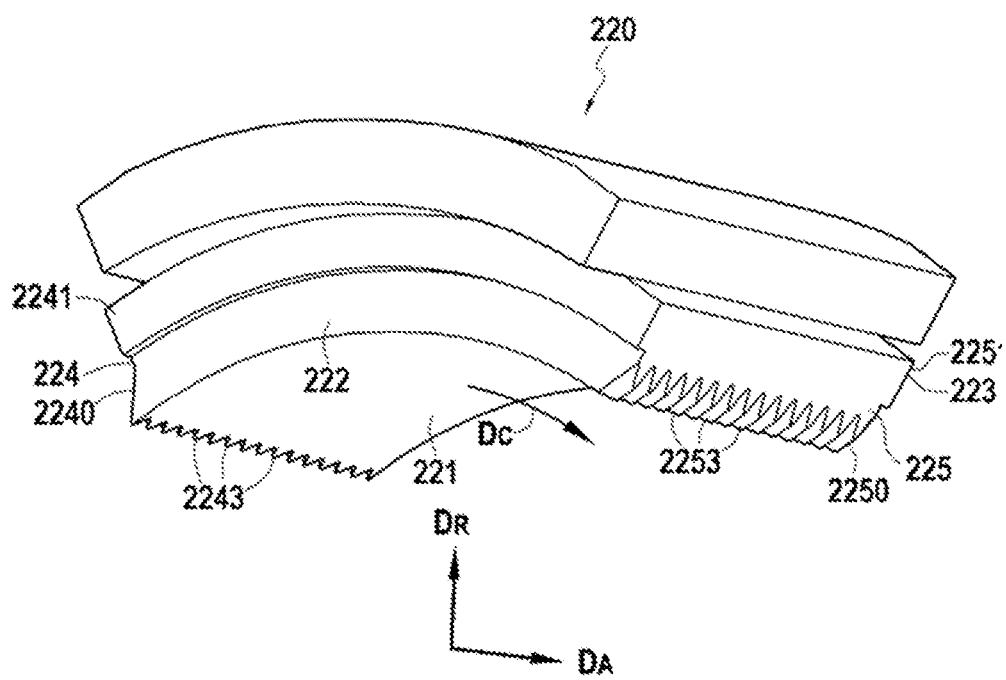

[Fig. 10A]
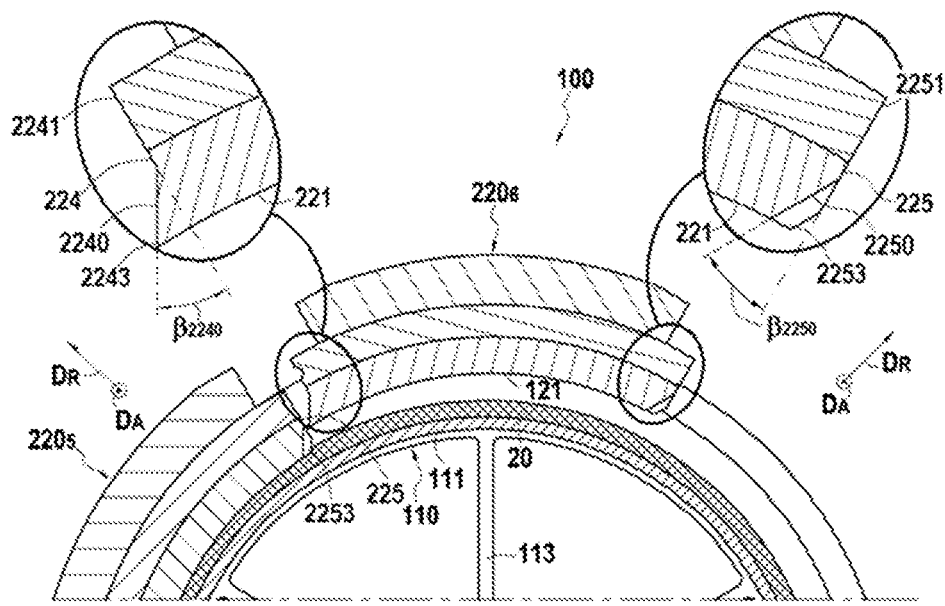
[Fig. 10B]
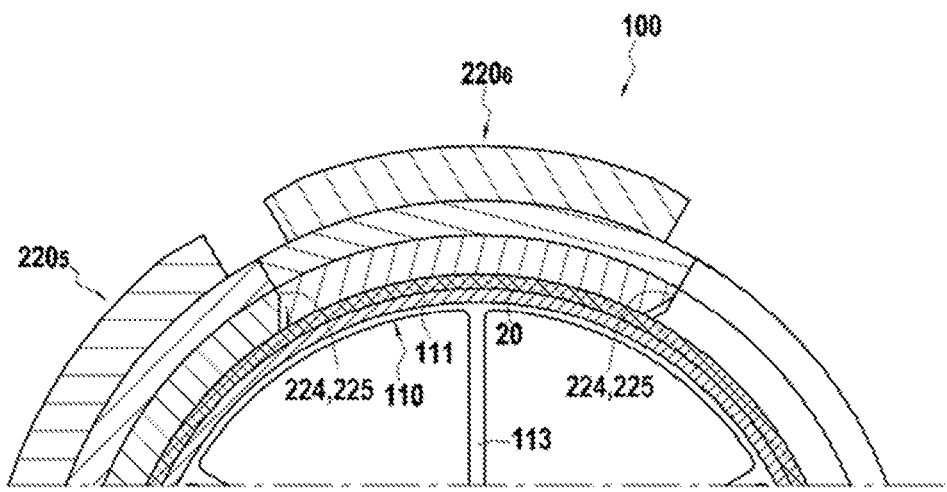

RTM INJECTION MOLD AND METHOD USING ASYMMETRIC ANTI-PINCHING SECTORS

CROSS-REFERENCE TO RELATED APPLICATION(S)

This application claims the benefit of priority under 35 U.S.C. § 119 to U.S. Provisional Patent Application No. 63/034,571, filed on Jun. 4, 2020, the entirety of which is incorporated herein by reference.

TECHNICAL FIELD

The present invention relates to the general field of manufacturing axisymmetric parts such as gas turbine casings.

PRIOR ART

In the aeronautical field, it is desired to reduce the mass of engine components while still maintaining their mechanical properties at a high level. For example, in an aeronautical turbine engine, the fan casing defining the contour of the air inlet stream of the engine and within which is housed the rotor supporting the blades of the fan is now produced of composite material.

The manufacture of a fan casing of composite material starts with the installation by winding of a fiber reinforcement on a mandrel, the profile of which molds itself to that of the casing to be produced. The fibrous reinforcement can be created, for example, by three-dimensional or multilayer weaving as described in U.S. Pat. No. 8,322,971. This fibrous reinforcement constitutes a tubular fibrous preform with flanges corresponding to the flanges of the casing. Manufacturing continues with the densification of the fibrous preform by a polymer matrix which consists of impregnating the preform with a resin and polymerizing the latter to obtain the final part.

The invention relates more particularly to the manufacturing mode where the impregnation of the fibrous preform is accomplished by the injection molding method called RTM (for resin transfer molding). According to this method, the fibrous preform is enclosed in a rigid mold with fixed geometry comprising a mandrel or drum on which the fibrous preform is wound and a counter-mold which is deposited on the fibrous preform and the shape of which corresponds to the axisymmetric part that it is desired to obtain, and the resin is injected under controlled pressure and temperature inside the mold after having brought together the walls of the two parts of the mold and having formed a vacuum in it if necessary. Once the resin is injected, its polymerization is carried out by heating the mold and after the injection and the polymerization, the final part is de-molded then trimmed to remove excess resin, and the chamfers are machined to obtain the desired part, a casing for example.

As the preform is oversized at the time of its winding on the mandrel, i.e. it has excess thickness relative to the theoretical thickness of the finished part, the closing of the mold also provides the function of final compacting of the preform to bring it to its final thickness.

FIG. 1 illustrates an RTM injection mold 300 consisting of a drum or mandrel 310 on which is wound a fibrous preform 30 and a counter-mold formed by a plurality of angular sectors 320. The closing of the mold is accomplished by the angular sectors 320 which ensure the compacting of the preform. A method of closing a mold of this type is described in particular in document US 2018/370082.

However, the closing of the mold by angular sectors of this type proves to be a delicate operation. In fact, as illustrated in FIG. 2A, first one sector out of two is placed, each of which locally compacts the fibrous preform. The fibrous preform 30 has blisters 31 in proximity to the ends of each angular sector 320, because it is no longer compacted. The closing of the mold continues with the positioning of the remaining angular sectors between the sectors already positioned as illustrated in FIGS. 2B and 2C. During the installation of these sectors, the blisters 31 are driven out against the edges of the already positioned sectors because the preform is driven from the middle of the sector by the compaction. In addition, the shape of the sectors and the direction of closing of the mold ensure that there subsists a space between the sectors until the last moment of the closing of the mold. A part of the blisters 31 then penetrates into this space to be finally pinched between the edges of the adjacent sectors as shown in FIG. 2C. The fibers of the preform thus pinched can cause a deterioration of the mold, poor sealing of it and especially the creation of faults called "pinch fibers" on the finished part.

DISCLOSURE OF THE INVENTION

The invention has as its object to propose a solution which avoids pinching of the fibers of a preform during the closing of an injection mold.

This object is achieved in particular thanks to an injection mold for the manufacture of an axisymmetric part of composite material comprising:
  a mandrel intended to support a fibrous preform formed by winding, the mandrel comprising an annular wall the profile of the outer surface of which corresponds to that of the inner surface of the part to be manufactured,
  a plurality of counter-mold angular sectors assembled on the mandrel and intended to close the mold and to compact the fibrous preform wound on the mandrel, each angular sector comprising an annular base intended to come into contact with the fibrous preform, the annular base extending between the first and second longitudinal edges in an axial direction and between the first and second lateral edges in a circumferential direction, the first lateral edge of the annular base of an angular sector being in contact with a second lateral edge of the annular base of an adjacent angular sector,
  characterized in that some angular sectors of the plurality of angular sectors include a protruding lower portion forming a first nonzero angle relative to a radial direction on the first lateral edge of the annular base and a recessed lower portion forming a second nonzero angle relative to the radial direction on the second lateral edge of the annular base, the first and second angles having the same extent.

The lower portions, respectively protruding and recessed, present on each angular sector will allow pushing or "chasing" away the preform portion which blisters outside the lateral edge of the angular sector. As the part of the lateral edges of each angular sector in contact with the fibrous preform, namely the lower protruding and recessed portions, are parallel to the closing direction, i.e parallel to the radial direction in the middle of the sector, there is no space between the two sectors at the time of closing. The risk of pinching these yarns and, consequently, the preform, is considerably reduced. It is thus possible to compact a preform with each of the angular sectors without risking pinching it at the junction between two adjacent sectors.

According to one particular embodiment of the angular sectors of the mold of the invention, the protruding lower portion forming a first nonzero angle relative to a radial direction on the first lateral edge of the annular base of each angular sector includes a first plurality of teeth and the recessed lower portion forming a second nonzero angle relative to the radial direction on the second lateral edge of the annular base of each angular sector includes a second plurality of teeth able to cooperate with the first plurality of teeth present on an adjacent angular sector. The presence of teeth on the sloping lower portions further reduces the risk of pinching the fibrous preform at the junction of the angular sectors.

According to one particular feature of the mold of the invention, each angular sector includes a first lateral face parallel to the radial direction and present in the continuation of the first lateral edge of the annular base and a second lateral face parallel to the radial direction and present in the continuation of the second lateral edge of the annular base. This allows having less protruding angles.

According to another particular feature of the mold of the invention, an angular sector of the plurality of angular sectors includes a protruding lower portion forming the first nonzero angle relative to a radial direction on the first and second lateral edges of the annular base, while another angular sector of the plurality of angular sectors includes a recessed lower portion forming the second nonzero angle relative to the radial direction on the first and second lateral edges of the annular base, the first and second angles having the same extent. This allows optimizing the anti-pinching effect for all the angular sectors as explained hereafter in detail.

According to yet another particular features of the mold of the invention, the first nonzero angle relative to the radial direction formed by the sloping lower portion of the first lateral edge of an angular sector is comprised between 18° and 45°.

The invention also has as its object a method of closing an injection mold for the manufacture of an axisymmetric part of composite material, the mold comprising:
- a mandrel supporting the fibrous preform obtained by winding a fibrous strip, the mandrel comprising an annular wall of which the profile of the outer surface corresponds to that of the inner surface of the part to be manufactured,
- a plurality of angular sectors comprising an annular base intended to come into contact with the fibrous texture, the annular base extending between the first and second longitudinal edges in an axial direction and between the first and second lateral edges in a circumferential direction, characterized in that some angular sectors of the plurality of angular sectors include a protruding lower portion forming a first nonzero angle relative to a radial direction on the first lateral edge of the annular base and a recessed lower portion forming a second nonzero angle relative to the radial direction on the second lateral edge of the annular base, the first and second angles having the same extent, and in that the method comprises the successive positioning and attachment of each angular sector on the mandrel, the annular base of each sector compacting the fibrous preform portion present facing it, the first lateral edge of the annular base of an angular sector being positioned being held in contact with a second lateral edge of the annular base of an adjacent angular sector already attached to the mandrel.

According to one particular embodiment of the angular sectors of the mold of the invention, the protruding lower portion forming a first nonzero angle relative to a radial direction on the first lateral edge of the annular base of each angular sector includes a first plurality of teeth and the recessed lower portion forming a second nonzero angle relative to the radial direction on the second lateral edge of the annular base of each angular sector includes a second plurality of teeth able to cooperate with the first plurality of teeth present on an adjacent angular sector.

According to one particular feature of the method of the invention, each angular sector includes a first lateral face parallel to the radial direction and present in the continuation of the first lateral edge of the annular base and a second lateral face parallel to the radial direction and present in the extension of the second lateral edge of the annular base.

According to another particular feature of the method of the invention, one angular sector of the plurality of angular sectors includes a protruding lower portion forming a first nonzero angle relative to a radial direction on the first and second lateral edges of the annular base while another angular sector of the plurality of angular sectors includes a recessed lower portion forming the second nonzero angle relative to the radial direction on the first and second lateral edges of the annular base, the first and second angles having the same extent. This allows optimizing the anti-pinching effect for all the angular sectors as explained hereafter in detail.

According to another particular feature of the method of the invention, the first nonzero angle relative to the radial direction formed by the sloping lower portion of the first lateral edge of an angular sector is comprised between 18° and 45°.

BRIEF DESCRIPTION OF THE DRAWINGS

FIG. 1 is a schematic perspective view of an injection mold according to the prior art, FIG. 2A is a partial radial section view showing a step of closing the mold of FIG. 1, FIG. 2B is a partial view in radial section showing another step of closing the mold of FIG. 1, FIG. 2C is a partial view in radial section showing another step of closing the mold of FIG. 1, FIG. 3 is a schematic perspective view of a fan casing of composite material, FIG. 4 is a schematic perspective view of an injection mold in conformity with an embodiment of the invention, FIG. 5 is a schematic perspective view showing an angular sector of the mold of FIG. 4 in conformity with an embodiment of the invention, FIG. 6 is a schematic perspective view showing the angular sector of FIG. 5 in another orientation, FIG. 7A is a partial radial section view showing the closing of the mold of FIG. 4, FIG. 7B is a partial radial section view showing the mold of FIG. 4 closed, FIG. 8 is a schematic perspective view showing an angular sector of the mold of FIG. 4 in conformity with another embodiment of the invention, FIG. 9 is a schematic perspective view showing the angular sector of FIG. 8 in another orientation, FIG. 10A is a partial radial section view showing the closing of the mold of FIG. 4, FIG. 10B is a partial radial section view showing the mold of FIG. 4 closed.

DESCRIPTION OF THE EMBODIMENTS

The invention applies generally to any gas turbine casing of organic matrix composite material.

The invention will be described hereafter within the scope of its application to a fan casing of an aeronautical gas turbine engine.

FIG. 3 shows a perspective view of a fan casing 10 which can be manufactured using a mold and a method according to the invention. A casing of this type is centered on a longitudinal axis X-X and comprises an annular wall 11 delimited upstream by an upstream flange 12 and downstream by a downstream flange 13 (upstream and downstream being defined relative to the flow direction of the gas flow in a gas turbine). The inner surface 14 of the annular wall 11 is intended to delimit the air inlet stream in the gas turbine or to support the panels, shells, etc. which define this stream.

FIG. 4 is a schematic perspective view of a mold according to the invention during closing. A mold of this type can be used for impregnation by a method of the RTM ("resin transfer molding") type of a fibrous preform in order to manufacture a fan casing 10 like that previously presented. The fibrous preform can be created by three-dimensional weaving of a fibrous texture in the form of a strip with fibers, for example carbon, glass, aramid or ceramic, and the impregnation matrix can be a polymer, for example epoxy, bismaleimide or polyimide.

The mold 100 is mounted in rotation on a drive shaft (not shown) centered on the axis X-X, and comprises a mandrel 110. Hereafter, the axial $D_A$ and radial $D_R$ directions will be defined relative to this axis X-X, the axial direction $D_A$ being parallel to the axis X-X and the radial direction $D_R$ being perpendicular to the axis X-X. Reference will also be made to a circumferential direction $D_C$ which, as shown in FIG. 4, corresponds to a direction which is tangent to any circle centered on the axis X-X. This direction is perpendicular both to the axial direction $D_A$ and to a radial direction $D_R$.

The mandrel 110 comprises an annular wall 111 taking the shape of a drum supporting a fibrous preform 20 formed by winding a fibrous strip, and two lateral flanges 112. The mandrel 110 is retained on its drive shaft by means of spokes 113.

The flanges 112 form a support intended to receive the folded-back parts of the preform 20 wound on the mandrel 110, and which are intended to form the upstream 12 and downstream 13 flanges of the fan casing 10.

The mold 100 further comprises a counter-mold consisting of several angular sectors 120, (six in number here) assembled in a sealed manner on the mandrel 110, and locked together in a sealed manner by locking keys 130 which maintain a flat seal between the sectors (not shown in FIG. 4). According to one variant embodiment, the sectors can be directly locked together by bolting by using oblique screws. In this case, sealing between the sectors is accomplished by compaction of a seal housed in the grooves present on the lateral edges of the sectors as explained hereafter.

The angular sectors 120 are assembled on the lateral flanges 112 by clamping screws 131 passing in openings 122 present in the sectors 120 and screwed into tapped holes 1120 present on the lateral flanges 112. The screws 131 allow the assembly of the sectors 120 on the flanges 112 and the adjustment of the compaction pressure which is applied to the fibrous preform 20. The tapped holes can be replaced by nuts inserted into the cages, which facilitates maintenance in the case of an aluminum mold.

In the example described here, the angular sectors 120 are locked together by clamping screws 141 passing in openings 132 present in the locking keys 130 and screwed into tapped holes 121 present in the angular sectors 120. A key 130 is attached between two adjacent sectors 120 by two rows of screws 141 extending longitudinally on the ends of each sector 120. The assembly of the locking keys 130 is accomplished radially from the outside, once the sectors 120 are assembled on the mandrel 110. In this manner, the keys ensure circumferential clamping of the sectors 120 to one another.

O ring seals (not shown) positioned on the flanges 112 ensure sealing between the sectors 120 and the mandrel 110.

FIGS. 5 and 6 illustrate an angular sector 120 in conformity with an embodiment of the invention. Each angular sector 120 comprises an annular base 121 intended to come into contact with the fibrous texture 20. The annular base extends between the first and second longitudinal edges 122 and 123 in the axial direction $D_A$ and between the first and second lateral edges 124 and 125 in the circumferential direction $D_C$, the first lateral edge 124 of the annular base 121 of an angular sector 120 being in contact with a second lateral edge 125 of the annular base of an adjacent angular sector (FIG. 7B). The first lateral edge 124 of the annular base 121 of each angular sector 120 includes a protruding lower portion 1240 in the form of a slope forming a first nonzero angle $\beta_{1240}$ relative to a radial direction $D_R$. The second lateral edge 125 of the annular base 121 of each angular sector includes a recessed lower portion 1250 in the form of a slope forming a second nonzero angle $\beta_{1250}$ relative to the radial direction $D_A$, the first and second angles $\beta_{1240}$ and $\beta_{1250}$ having the same extent (FIG. 7A).

FIGS. 7A and 7B illustrate the positioning of an angular sector during the closing of the mold 100. More precisely, in FIG. 7A, an angular sector $120_6$ is being positioned, the angular sector $120_5$ being already positioned. Thanks to its protruding configuration and its contact with the complementary recessed portion of the adjacent sector during positioning of the sector $120_6$, the protruding lower portion 1240, present on the lateral edge 124 of the sector, will push or "chase" away the portion of the preform 20 which blisters outside the lateral edge 125 of the angular sector $120_5$. As the part of the lateral edges of each angular sector in contact with the fibrous preform 20, namely the lower protruding and recessed portions 1240 and 1250, are parallel to the closing direction, i.e. parallel to the radial direction $D_R$ in the middle of the sector, there is no space between the two sectors at the moment of closing. Thus the risk of pinching these yarns, and consequently the preform, is considerably reduced.

It is thus possible to compact the preform 20 with each of the angular sectors 120 without risking pinching it between two adjacent sectors as shown in FIG. 7B.

According to one particular embodiment, the first and second lateral edges of an angular sector of the plurality of angular sectors includes a protruding lower portion forming a first nonzero angle relative to a radial direction, while the first and second lateral edges of another angular sector of the plurality of angular sectors includes a recessed lower portion forming a second nonzero angle relative to a radial direction, the first angle and the second angle having the same extent. The other angular sectors of the plurality of angular sectors include a protruding lower portion forming a first nonzero angle relative to a radial direction on the first lateral edge of the annular base and a recessed lower portion forming a second nonzero angle relative to the radial direction on the second lateral edge of the annular base, the first angle and the second angle having the same extent. In this case, the angular sector including symmetrically two recessed lower portions is positioned first during the closing of the mold while the angular sector including symmetrically two protruding lower portions is positioned last to finalize the closing of the mold. In fact, in order to optimize the anti-pinching effect of the angular sectors during the closing of the mold, a recessed lower portion is preferably positioned before the protruding lower portion of the adjacent sector. By positioning first the angular sector including symmetrically two recessed lower portions, it is ensured that during positioning of the last angular sector, here the one including symmetrically two protruding lower portions, two recessed lower portions are positioned before the positioning of the last sector, here the one including symmetrically two protruding lower portions.

Each angular sector 120 further includes a first lateral face 1241 parallel to the radial direction $D_R$ and present in the continuation of the first lateral edge 124 of the annular base 121, and a second lateral face 1251 parallel to the radial direction $D_R$ and present in the continuation of the second lateral edge 125 of the annular base 121.

According to a particular feature of the invention, the first nonzero angle $\beta_{1240}$ relative to the radial direction formed by the protruding lower portion 1240 of the first lateral edge 124 of an angular sector is comprised between 18° and 45°.

FIGS. 8 and 9 illustrate an angular sector 220 in conformity with another embodiment of the invention. Similarly to the angular sectors 120 previously described, each angular sectors 220 comprises an annular base 221 intended to come into contact with the fibrous texture 20. The annular base 221 extends between the first and second longitudinal edges 222 and 223 in the axial direction $D_A$ and between the first and second lateral edges 224 and 225 in the circumferential direction $D_C$, the first lateral edge 224 of the annular base 221 of an annular sector 220 being in contact with a second lateral edge 225 of the annular base of an adjacent angular sector (FIG. 10B). The first lateral edge 224 of the annular base 221 of each angular sector 220 includes a protruding lower portion 2240 in the form of a slope forming a first nonzero angle $\beta_{2240}$ relative to a radial direction $D_R$. The second lateral edge 225 of the annular base 221 of each angular sector includes a recessed lower portion 2250 in the form of a slope forming a second nonzero angle $\beta_{2250}$ relative to the radial direction $D_R$, the first and second angles $\beta_{2240}$ and $\beta_{2250}$ having the same extent (FIG. 10A).

The angular sectors 220 differ from the angular sectors 120 in that the protruding lower portion 2240 of the first lateral edge 240 further includes a first plurality of teeth 2243 and in that the recessed lower portion 2250 of the second lateral edge 2250 includes a second plurality of teeth 2253. The first plurality of teeth 2243 present on an angular sector 220 is able to cooperate with the second plurality of teeth 2253 present on an adjacent angular sector while the second plurality of teeth 2253 present on the same angular sector is able to cooperate with the first plurality of teeth 2243 present on the other adjacent angular sector (FIG. 10B).

FIGS. 10A and 10B illustrate the positioning of an angular sector during the closing of the mold. More precisely, in FIG. 10A, a final angular sector $220_6$ is being positioned, the angular sector $220_5$ already being positioned. Thanks to its sloping configuration and its contact with the complementary sloping portion of the adjacent sector during positioning of the sector $220_6$, the protruding lower portion 2240 present on the lateral edge 224 of the sector will push or "chase" away the preform portion 20 which blisters outside the lateral edge 225 of the angular sector $220_5$, the plurality of teeth 2243 of the lateral edge 224 of the sector $220_6$ engaging with the plurality of teeth 2253 of the lateral edge 225 of the sector $220_5$. The part of the lateral edges of each angular sector in contact with the fibrous preform 20, namely the teeth 2243 and 2253, not being perpendicular to its yarns, in particular the warp yarns, the risk of pinching these yarns and, consequently, the preform, is considerably reduced.

It is thus possible to compact the preform 20 with each of the angular sectors 220 without risking pinching it between two adjacent sectors as illustrated in FIG. 10B.

Each angular sector 220 further includes a first lateral face 2241 parallel to the radial direction $D_R$ and present in the continuation of the first lateral edge 224 of the annular base 221, and a second lateral face 2251 parallel to the radial direction $D_R$ and present in the continuation of the second lateral edge 225 of the annular base 221. This facilitates the attachment of the sectors 220 to the mandrel 110.

According to a particular feature of the invention, the first nonzero angle 132240 relative to the radial direction formed by the protruding lower portion 2240 of the first lateral edge 224 of an angular sector is comprised between 18° and 45°.

The manufacture of the casing 10 shown in FIG. 3 starts with the creation of a fibrous texture by three-dimensional weaving of the warp yarns and of the weft yarns. What is meant here by "three-dimensional weaving" or "3D weaving" is a weaving mode by which some at least of the weft yarns link to the warp yarns on several layers of warp yarns, or conversely. The fibrous texture can have an interlock weaving pattern. What is meant here by "interlock" weaving is a weaving pattern in which each layer of weft yarns connects several layers of warp yarns, with all the yarns of the same weft column having the same movement in the plane of the pattern. Other weaving patterns can be considered. The yarns used can in particular be carbon fiber, glass or silicon carbide yarns. The fibrous texture has the shape of a strip which is wound in several turns on the mandrel 110 of the mold 110 to form the fibrous preform 20.

The mold 100 is then closed by means of the angular sectors 120 or 220 described previously, these sectors further accomplishing the compacting of the preform 20.

The densification of the fibrous preform is then undertaken, which consists of filling the porosity of the latter with the material constituting the matrix. To this end, the matrix precursor liquid, a resin for example is injected into the entire preform present in the mold. The transformation of the precursor into an organic matrix, namely its polymerization, is accomplished by thermal treatment, generally by heating the mold, after elimination of solvent, if any, and curing of the polymer, the preform being constantly held in the mold having a shape corresponding to that of the part to be produced. The organic matrix can in particular be obtained from epoxy resins, such as for example the high-performance epoxy resin sold or liquid precursors of carbon or ceramic matrices.

The densification of the fibrous preform can be accomplished by the well-known method of transfer molding called RTM ("resin transfer molding") which consists of injecting a thermosetting resin into the internal space of the mold containing the fibrous preform, a pressure gradient being generally established in this internal space between the location where the resin is injected and the outlets of the latter in order to control and optimize the impregnation of the preform by the resin. Once the resin is injected into the entire preform, its polymerization is undertaken by thermal treatment in conformity with the RTM method.

After injection and polymerization, the part is de-molded. The part is finally trimmed to remove excess resin and the chamfers are machined to obtain a casing 10 having an axisymmetric shape as illustrated in FIG. 3.

The invention claimed is:

1. An injection mold for the manufacture of an axisymmetric part of composite material comprising:

a mandrel intended to support a fibrous preform formed by winding, the mandrel comprising an annular wall, a profile of an outer surface of which corresponds to that of an inner surface of the part to be manufactured, a plurality of counter-mold angular sectors assembled on the mandrel and intended to close the mold and to compact the fibrous preform wound on the mandrel, each angular sector comprising an annular base intended to come into contact with the fibrous preform, a first lateral face that extends parallel to a radial direction, and a second lateral face that extends parallel to the radial direction, the annular base extending between the first and second longitudinal edges in an axial direction and between the first and second lateral edges in a circumferential direction, the first lateral edge of the annular base of an angular sector being in contact with a second lateral edge of the annular base of an adjacent annular sector, wherein at least some angular sectors of the plurality of angular sectors include a protruding lower portion that protrudes from the first lateral face in the circumferential direction along a surface of the annular base intended to come into contact with the fibrous preform, forming a first nonzero angle relative to the radial direction on the first lateral edge of the annular base and a recessed lower portion set back from the second lateral face in the circumferential direction along the surface of the annular base intended to come into contact with the fibrous preform, forming a second nonzero angle relative to the radial direction on the second lateral edge of the annular base, the first and second angles having the same extent, wherein each first lateral face is part of a continuous surface that includes the protruding lower portion and the first lateral edge of the annular base, and each second lateral face is part of a continuous surface that includes the recessed lower portion and the second lateral edge of the annular base.

2. The injection mold according to claim 1, wherein the protruding lower portion forming the first nonzero angle relative to the radial direction on the first lateral edge of the annular base of each angular sector includes a first plurality of teeth and in which the recessed lower portion forming the second nonzero angle relative to the radial direction on the second lateral edge of the annular base of each angular sector includes a second plurality of teeth able to cooperate with the first plurality of teeth present on an adjacent angular sector.

3. The injection mold according to claim 1, wherein an arc-shaped surface extends continuously from each protruding lower portion to each recessed lower portion, the arc-shaped surface being concave along the radial direction when the angular sector is viewed from the axial direction.

4. The injection mold according to claim 1, wherein the first nonzero angle relative to the radial direction formed by the protruding lower portion of the first lateral edge of an angular sector is comprised between 18° and 45°.

5. A method of closing an injection mold for the manufacture of an axisymmetric part of composite material, the mold comprising:

a mandrel supporting a fibrous preform obtained by winding a fibrous strip, the mandrel comprising an annular wall, a profile of an outer surface of which corresponds to that of an inner surface of the part to be manufactured, a plurality of angular sectors comprising an annular base intended to come into contact with the fibrous texture, a first lateral face that extends parallel to a radial direction, and a second lateral face that extends parallel to the radial direction, the annular base extending between the first and second longitudinal edges in an axial direction and between the first and second lateral edges in a circumferential direction, wherein at least some angular sectors of the plurality of angular sectors include a protruding lower portion that protrudes from the first lateral face in the circumferential direction along a surface of the annular base intended to come into contact with the fibrous preform, forming a first nonzero angle relative to the radial direction on the first lateral edge of the annular base and a recessed lower portion set back from the second lateral face in the circumferential direction along the surface of the annular base intended to come into contact with the fibrous preform, forming a second nonzero angle relative to the radial direction on the second lateral edge of the annular base, the first and second angles having the same extent, wherein each first lateral face is part of a continuous surface that includes the protruding lower portion and the first lateral edge of the annular base, and each second lateral face is part of a continuous surface that includes the recessed lower portion and the second lateral edge of the annular base, wherein the method comprises the successive positioning and attachment of each angular sector on the mandrel, the annular base of each sector compacting the fibrous preform portion present facing it, the first lateral edge of the annular base of an angular sector being positioned being held in contact with a second lateral edge of the annular base of an adjacent angular sector already attached to the mandrel, wherein the protruding lower portion contacts the fibrous preform.

6. The method according to claim 5, wherein the protruding lower portion forming the first nonzero angle relative to the radial direction on the first lateral edge of the annular base of each angular sector includes a first plurality of teeth and wherein the recessed lower portion forming the second nonzero angle relative to the radial direction on the second lateral edge of the annular base of each angular sector includes a second plurality of teeth able to cooperate with the first plurality of teeth present on an adjacent angular sector.

7. The method according to claim 5, wherein an arc-shaped surface extends continuously from each protruding lower portion to each recessed lower portion, the arc-shaped surface being concave along the radial direction when the angular sector is viewed from the axial direction.

8. The method according to claim 5, wherein the first nonzero angle relative to the radial direction formed by the protruding lower portion of the first lateral edge of an angular sector is comprised between 18° and 45°.

9. An injection mold for the manufacture of an axisymmetric part of composite material comprising:

a mandrel intended to support a fibrous preform formed by winding, the mandrel comprising an annular wall, a profile of an outer surface of which corresponds to that of an inner surface of the part to be manufactured, a plurality of counter-mold angular sectors assembled on the mandrel and intended to close the mold and to compact the fibrous preform wound on the mandrel, each angular sector comprising an annular base intended to come into contact with the fibrous preform, a first lateral face that extends parallel to a radial direction, and a second lateral face that extends parallel to the radial direction, the annular base extending between the first and second longitudinal edges in an axial direction and between the first and second lateral edges in a circumferential direction, the first lateral edge of the annular base of an angular sector being in contact with a second lateral edge of the annular base of an adjacent annular sector, wherein at least some angular sectors of the plurality of angular sectors include a protruding lower portion that protrudes from the first lateral face in the circumferential direction, forming a first nonzero angle relative to the radial direction on the first lateral edge of the annular base and a recessed lower portion set back from the second lateral face in the circumferential direction, forming a second nonzero angle relative to the radial direction on the second lateral edge of the annular base, the first and second angles having the same extent, wherein the protruding lower portion and the recessed lower portion are located along only a portion of the respective angular sector, as measured along the radial direction.

\* \* \* \* \*